United States Patent [19]
Duckett

[11] 3,945,663
[45] Mar. 23, 1976

[54] OLEO/PNEUMATIC LEVELLING STRUTS
[75] Inventor: William Arthur Duckett, Ossett, England
[73] Assignee: Jonas Woodhead Limited, England
[22] Filed: July 26, 1974
[21] Appl. No.: 492,274

[30] Foreign Application Priority Data
July 27, 1973 United Kingdom............... 35905/73

[52] U.S. Cl.............. 280/124 F; 188/315; 267/64 R
[51] Int. Cl.²........................................ B60G 17/04
[58] Field of Search......... 280/124 F; 188/298, 315; 267/64 R

[56] References Cited
UNITED STATES PATENTS

| | | | |
|---|---|---|---|
| 2,997,291 | 8/1961 | Stultz | 188/315 |
| 3,024,875 | 3/1962 | Stultz | 188/315 |
| 3,123,347 | 3/1964 | Stormer | 267/64 R |
| 3,610,656 | 10/1971 | Klees | 280/124 F |
| 3,627,348 | 12/1971 | Klees | 280/124 F |
| 3,720,425 | 3/1973 | Asano | 280/124 F |

FOREIGN PATENTS OR APPLICATIONS

| | | |
|---|---|---|
| 1,035,509 | 7/1966 | United Kingdom |
| 1,044,102 | 9/1966 | United Kingdom |
| 1,044,108 | 9/1966 | United Kingdom |
| 1,162,999 | 9/1969 | United Kingdom |
| 1,194,234 | 6/1970 | United Kingdom |

Primary Examiner—Philip Goodman
Assistant Examiner—John A. Carroll
Attorney, Agent, or Firm—Oblon, Fisher, Spivak, McClelland & Maier

[57] ABSTRACT

A hydro-pneumatic suspension strut for use in a self-levelling vehicle suspension system. The strut is similar in construction to a pressurized two-tube shock absorber, having a working cylinder in which a piston having damping valves is slidable, and an annular oil reservoir communicating with one end of and surrounding the working cylinder. The reservoir contains two flexible sacs, one of which contains gas for pressurizing the strut and providing suspension resilience, while the other is provided with an inlet for connection to the vehicle suspension system, so that it can be inflated to cope with increased loads.

10 Claims, 3 Drawing Figures

OLEO/PNEUMATIC LEVELLING STRUTS

BACKGROUND OF THE INVENTION

This invention relates to suspension struts for use in self-levelling suspension systems of vehicles.

A typical self-levelling suspension system comprises an accumulator for storing fluid under pressure, a pump for maintaining the reservoir full of fluid under pressure, and, for each wheel of the vehicle, a suspension strut which transfers a vertical load between the body of the vehicle and the wheel, and a levelling valve which controls the admission of fluid under pressure from the reservoir to, or the release of fluid from the cylinder of a piston and cylinder assembly forming part of the strut, the levelling valve being arranged to keep the height of the vehicle body constant despite changes in load. Such systems often use oil as the fluid, and in this case each suspension strut usually includes means arranged to damp movements of the strut by causing the oil to flow through a constriction on extension or contraction of the strut. Also, the working cylinder of the strut may contain, or communicate with a vessel containing, a quantity of air or other gas, to provide the resilience needed in the suspension system. This makes it possible to dispense with the steel springs usually needed in a suspension system.

However, although suspension systems of the type described have a generally satisfactory performance, they suffer from certain disadvantages which result from the design of the struts used. One disadvantage is that, because the fluid in the interior of the working cylinder is supplied from the rest of the suspension system, contaminants may be introduced into the working cylinder with this oil. It is also possible for contaminants to be introduced into the working cylinder during fitting of the strut to the vehicle.

Another disadvantage is that the manufacturer of the strut cannot conveniently supply the strut filled with oil. Thus, although it is possible for the manufacturer to test the strut before delivery, it is not possible to leave the oil filling undisturbed between testing and fitting to a vehicle, and therefore testing does not guarantee reliable operation. Also, testing of the previously-known struts requires them to be connected to a fluid pressure system similar to the suspension system in which they are to be used.

Equally, it is not convenient for the manufacturer of the strut to supply the strut with the space which, in operation, forms a gaseous suspension spring, already pressurized, since it would be almost impossible to fit the strut to the vehicle and connect it to the fluid pressure system without upsetting the pressurization of this space.

SUMMARY OF THE INVENTION

It is an object of the invention to provide a levelling strut wherein the liquid filling cannot become contaminated.

It is another object of the invention to provide a levelling strut which can be filled with liquid by the manufacturer of the strut, and fitted to a vehicle without disturbing the liquid filling.

It is another object of the invention to provide a levelling strut which can be pressurized during manufacture, and fitted to a vehicle without risk of upsetting the pressurization.

It is another object of the invention to provide a levelling strut which can be constructed by techniques similar to those used in the manufacture of shock absorbers.

According to the present invention, a levelling strut for a vehicle comprises: a working cylinder; a piston rod which is guided concentrically with the working cylinder for axial sliding movement, with one end of the piston rod projecting from said working cylinder; a piston mounted on the other end of the piston rod for movement in the working cylinder; flow control means for permitting but controlling fluid flow between the zones of the working cylinder on either side of the piston; an outer cylinder which with the working cylinder defines an annular reservoir in communication with the working cylinder at least at one end of the working cylinder; a flexible wall isolating a portion of the annular reservoir; and means for connecting said isolated portion to a fluid line forming part of a ride height control system; the remainder of the annular reservoir and the working cylinder being filled with gas and liquid under pressure.

Thus the liquid filling of the strut is isolated from the fluid which is supplied to the isolated portion by the ride height control system, and cannot be contaminated. The flexible wall also serves to contain the gas and liquid filling of the reservoir, even when the isolated portion is not connected to a fluid line, so that the reservoir can be filled by the manufacturer of the strut and subsequently left undisturbed.

In the preferred construction, the flexible wall is in the form of a closed sac. The sac may be formed of two similarly-shaped sheets of flexible material bonded together around their peripheral regions. The gas in the annular reservoir may be contained in a further closed sac of similar construction to the first-mentioned closed sac. Each of the closed sacs may extend around more than half of the circumference of the annular reservoir, so that the sacs overlap along their longitudinal edges.

The invention also provides an improved connector for establishing communication with the interior of a sac. Thus, the means for connecting said isolated portion to a fluid line may comprise a member having a head inside the sac and a threaded stem projecting outwards through a wall of the sac and through the outer cylinder, and having a passage leading through the threaded stem to the interior of the sac; and a nut member screwed on to the threaded stem outside the outer cylinder to draw the head against the interior of the outer cylinder.

Other features of the invention will become clear from a study of the following description of the preferred embodiment, taken in conjunction with the drawings.

DETAILED DESCRIPTION OF A PREFERRED EMBODIMENT

Figure 1:
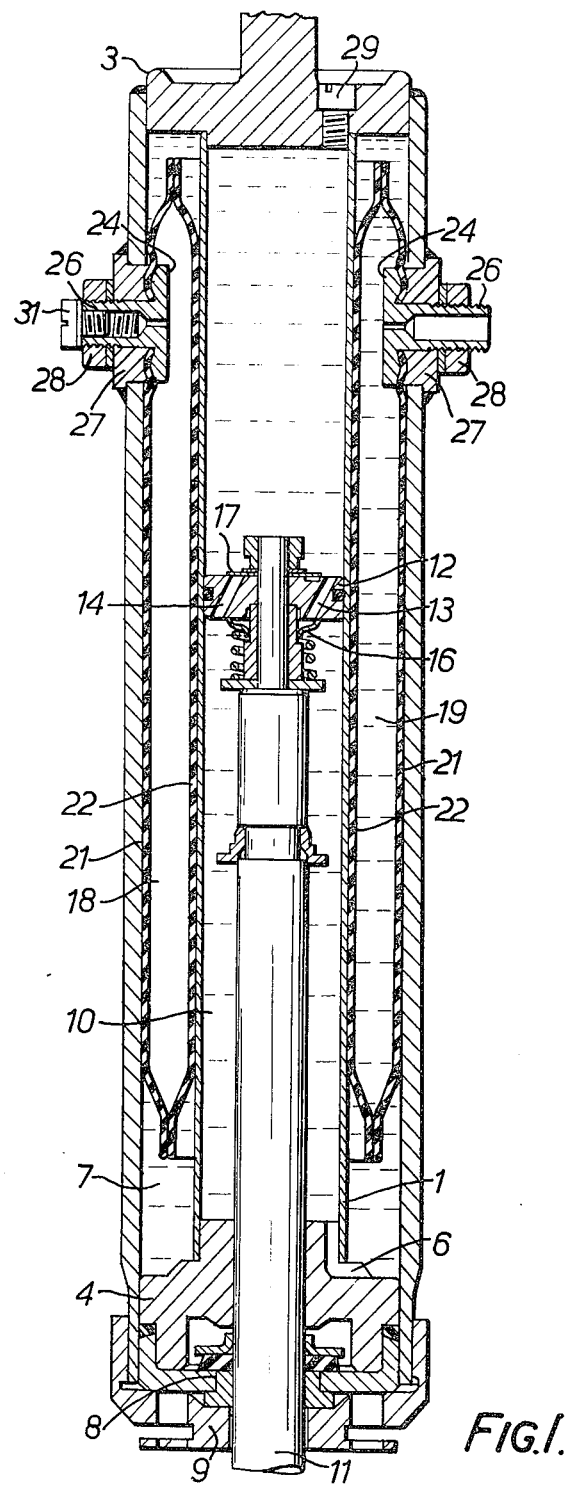
FIG. 1 is a longitudinal section through the strut.
Figure 2:
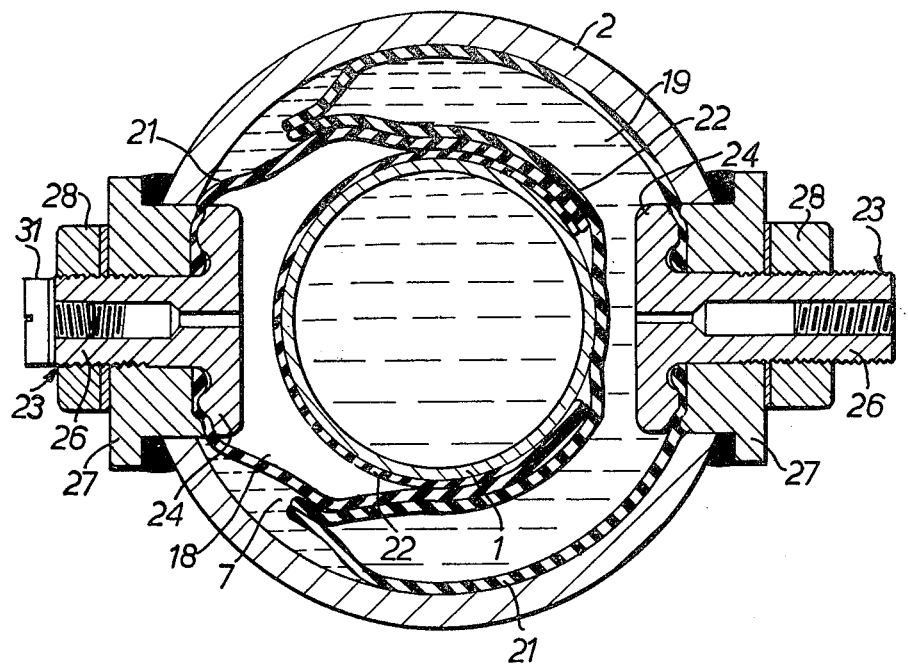
FIG. 2 is a cross-section on the line II—II of FIG. 1.

The strut includes a working cylinder 1 and an outer cylinder 2 which surrounds and is concentric with the working cylinder. The top ends of both the cylinders 1 and 2 are closed by an end cover 3, which is welded to the outer cylinder 2, and serves to keep the top end of the inner cylinder 2 concentric with the outer cylinder. The bottom ends of the cylinders 1 and 2 are maintained in concentric relationship by a piston rod guide 4, in which a passage 6 is formed to provide communication between the interior of the working cylinder 1 and the annular space 7 between the cylinders 1 and 2. The bottom ends of the cylinders are otherwise completely closed. The piston rod guide 4 and a seal assembly 8 which is housed below the guide 4 are held in place by an end cap 9 which is screwed on to the outer cylinder 2.

A piston rod 11 is slidably guided in the guide 4, and carries at its upper end a piston 12 which works in the working cylinder 1.

The piston 12 has passages 13 and 14 which are normally closed by spring-loaded valve discs 16 and 17. The piston rod 11 carries at its lower end means (not shown) for connecting the strut to an unsprung part of a vehicle, while the end cover 3 carries means (not shown) for connecting the strut to the body of the vehicle.

The annular space 7 contains two sacs 18 and 19, each of which is constructed of two rectangular sheets 21 and 22 of synthetic rubber or polyurethane material which are bonded together along their edge portions. Each sac is secured in position in the space 7 by a hollow feed nipple 23, which has a head 24 inside the sac and a threaded stem 26 which projects through a hole in the outside sheet 21 of the sac, and through a mounting bush 27 which is welded into a hole in the outer cylinder 2. A nut 28 is screwed on to the projecting end of the stem 26 to cause the sheet 21 to be gripped between the head 24 and the mounting bush 27. Each sac extends for much of the length of the space 7, and extends around about three-quarters of the circumference thereof. The nipples 23 are located near the top of the sacs, and in the center of the width of the sac, while the mounting bushes 27 are arranged diametrically opposite one another in the outer cylinder 2. Thus the free vertical edges of the two sacs 18 and 19 will overlap one another by about one-quarter of the circumference of the space 7.

The strut is supplied by the manufacturer with the whole of its interior, with the exception of the interior of the sacs 18 and 19, filled with oil, this being accomplished through an opening in the end cover 3 which is then sealed by a plug 29. The sac 19 is empty and unsealed, but the sac 18 is filled by the manufacturer with a gas, such as nitrogen, under pressure, and the associated feed nipple 23 is then sealed by a plug 31.

When the strut is installed in a motor vehicle, the feed nipple 23 associated with the sac 19 is connected to a fluid line leading from a ride height control system which may be of any suitable construction. When the vehicle is unladen (or carrying a load of less than a predetermined weight) the system will supply no fluid to the sac 19, which will remain completely deflated. The strut then operates as a combined shock absorber or damper and suspension spring in the following manner. The pressure in the sac 18 is such that the piston 12 will be approximately half-way along the length of the working cylinder 1. If the strut is compressed, oil will be forced from the space above the piston through the passage 13 into the annular space 10 below the piston and surrounding the piston rod 11. The spring-loaded valve disc 16 controls the flow to provide a damping action. Similarly, if the strut extends, oil flows in the opposite direction through the passage 14, and the valve disc 17 provides a damping action.

Oil will also flow into and out of the space 10 through the passage 6 leading to the space 7, because of the displacement of the piston rod 11. The sac 18 will expand and contract to accommodate the resulting changes in the volume of oil in the space 7, while the gas filling of the sac 18 maintains the pressure in the oil filling, so that the strut acts as a suspension spring; the internal pressure acts over the cross-sectional area of the piston rod 11 to support the load.

If a load (or a load of more than the predetermined weight) is now imposed on the vehicle, the ride height control system will detect the lowering of the body of the vehicle relative to the unsprung parts of the vehicle and fluid under pressure will be supplied to the sac 19, so that the volume of that part of the space 7 which is not occupied by the sac 19 is decreased. The pressure prevailing in the interior of the strut will be correspondingly increased, and the piston 12 will be moved downwards in the working cylinder 1 until the ride height is restored. Similarly, if the load is removed or reduced, the vehicle body will rise relative to the unsprung parts of the vehicle, and the ride height control system will release fluid from the sac 19 to reduce the pressure in the strut and restore the ride height.

Because the oil filling of the strut is substantially incompressible in comparison with the gas filling of the sac 18, the combined volume occupied by the two sacs 18 and 19 when the strut is in its equilibrium position remains practically constant despite variations in the load imposed on the vehicle. Thus, although the sacs overlap, they do not interfere with one another, because if one sac is fully inflated, the other will be largely deflated.

The fluid which is supplied by the ride height control system to the sac 19 may be oil, or some other liquid such as an anti-freeze composition, or a gas, or a mixture of gas and liquid, according to the suspension characteristics required.

Figure 3:
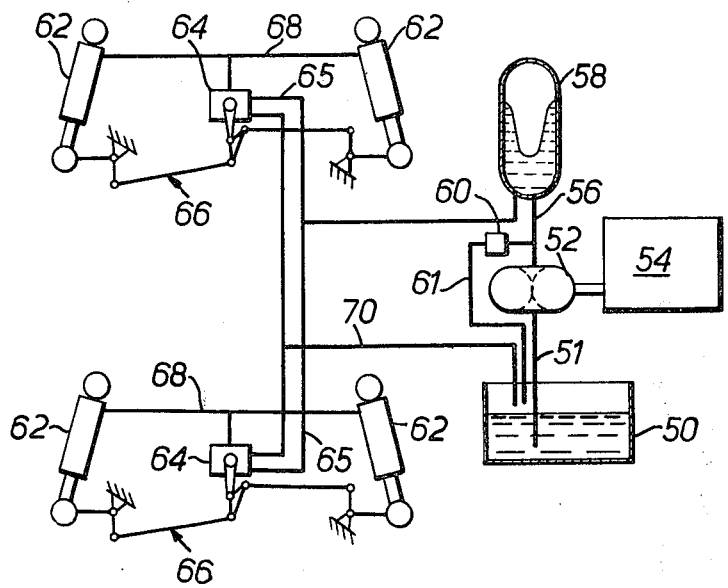
FIG. 3 is a diagrammatic drawing of a self-levelling vehicle suspension system in which the strut may be used.

FIG. 3 shows diagrammatically a self-levelling vehicle suspension system. The system includes an oil sump 50, a hydraulic pump 52 which is arranged to be driven by the engine 54 of the vehicle, and to draw oil from the sump 50 through a line 51 and deliver it under pressure through a line 56. The line 56 leads to a hydraulic accumulator 58, in which the oil is stored under pressure. A relief valve 60 allows excess oil delivered by the pump 52 to return to the sump through a line 61.

The weight of the vehicle body is transferred to the four wheels of the vehicle through four hydropneumatic struts 62 which are of the construction already described. The vehicle also includes front and rear levelling valves 64 which are fixed to the vehicle body and each of which has a valve member which is connected by a linkage 66 to the lower end of the struts associated in the front or rear wheels, respectively, so that movements of the two associated wheels relative to the body of the vehicle are averaged and transmitted to the valve member. The levelling valves 64 are supplied through lines 65 with oil from the accumulator 58, and are so arranged that if one or more of the wheels of the vehicle moves to an abnormally high position relative to the vehicle body, as for example when the load on the vehicle is increased, the associated levelling valve 64 admits oil under pressure from the line 65 to a line 68 leading to the sacs 19 in the associated struts 62. Conversely, when the load on the vehicle is reduced, the body of the vehicle rises relative to the wheels, and the valves 64 allow oil to flow from the sacs 19, through a line 70 and back to the sump 50.

Although the invention has been described with reference to a suspension strut having gas and oil fillings separated by a flexible sac, it is to be understood that any other means, such as a floating piston, may be used to separate the gas from the oil. It is also to be understood that the invention is also applicable to suspension struts in which there is no separation between the gas and the oil.

What I claim as my invention and desire to secure by Letters Patent is:

1. A levelling strut for a vehicle, comprising:
    a working cylinder;
    a piston rod which is guided concentrically with said working cylinder for axial sliding movement, with one end of said piston rod projecting from said working cylinder;
    a piston mounted on the other end of said piston rod for movement in said working cylinder;
    flow control means for permitting but controlling fluid flow between the zones of said working cylinder on either side of said piston;
    an outer cylinder which with said working cylinder defines an annular reservoir in communication with said working cylinder at least at one end of said working cylinder;
    a flexible wall isolating a portion of said annular reservoir;
    and means for connecting said isolated portion to a fluid line forming part of a ride height control system;
    the remainder of said annular reservoir and said working cylinder being filled with gas and liquid under pressure.

2. A strut according to claim 1 wherein said flexible wall is in the form of a closed sac.

3. A strut according to claim 2 wherein said sac is formed of two similarly-shaped sheets of flexible material, said sheets being bonded together around the peripheral regions thereof.

4. A strut according to claim 3 wherein said sheets are of rectangular shape.

5. A strut according to claim 4 wherein said sac extends around between one quarter and three quarters of the circumference of said annular reservoir.

6. A strut according to claim 5 wherein said gas in said reservoir is contained in a further closed sac of similar construction to said first-mentioned closed sac.

7. A strut according to claim 6 wherein each of said closed sacs extends around more than half of the circumference of said annular reservoir, with the longitudinal edges thereof overlapping the longitudinal edges of the other of said closed sacs.

8. A strut according to claim 1 wherein said flexible wall is in the form of a closed sac, and said means for connecting said isolated portion to a fluid line comprises: a member having a head inside said sac and a threaded stem projecting outwards through a wall of said sac and through said outer cylinder, and having a passage leading through said threaded stem to the interior of said sac; and a nut member screwed on to said threaded stem outside said outer cylinder to draw said head against the interior of said outer cylinder.

9. A strut according to claim 1 wherein said flexible wall is formed of an elastomeric material.

10. A vehicle including a self-levelling suspension system which comprises at least one strut arranged to transfer a load from the vehicle body to a road wheel of the vehicle, the strut comprising:
    a working cylinder;
    a piston rod which is guided concentrically with said working cylinder for axial sliding movement, with one end of said piston rod projecting from said working cylinder;
    a piston mounted on the other end of said piston rod for movement in said working cylinder;
    flow control means for permitting but controlling fluid flow between the zones of said working cylinder on either side of said piston to damp movements of said road wheel relative to said body of said vehicle;
    an outer cylinder which with said working cylinder defines an annular reservoir in communication with said working cylinder at least at one end of said working cylinder;
    and a flexible wall isolating a portion of said annular reservoir;
    the remainder of said annular reservoir and said working cylinder being filled with gas and liquid under pressure;
    and said suspension system further comprising a source of fluid pressure, and valve means arranged to control fluid flow from said source to said isolated portion and from said isolated portion to a region of lower pressure in dependence on the position of said road wheel relative to said body of said vehicle, to tend to maintain said road wheel in a predetermined position relative to said body.

* * * * *